US010719738B2

(12) United States Patent
Prokopenya et al.

(10) Patent No.: US 10,719,738 B2
(45) Date of Patent: Jul. 21, 2020

(54) COMPUTER-IMPLEMENTED METHODS AND COMPUTER SYSTEMS CONFIGURED FOR GENERATING PHOTOREALISTIC-IMITATING SYNTHETIC REPRESENTATIONS OF SUBJECTS

(71) Applicant: Banuba Limited, Wan Chai (HK)

(72) Inventors: Viktor Prokopenya, London (GB); Yury Hushchyn, Vilnius (BY); Alexander Lemeza, Minsk (BY)

(73) Assignee: Banuba Limited, Wan Chai (HK)

( * ) Notice: Subject to any disclaimer, the term of this patent is extended or adjusted under 35 U.S.C. 154(b) by 0 days.

(21) Appl. No.: 16/034,267

(22) Filed: Jul. 12, 2018

(65) Prior Publication Data

US 2019/0019063 A1 Jan. 17, 2019

Related U.S. Application Data

(60) Provisional application No. 62/531,607, filed on Jul. 12, 2017.

(51) Int. Cl.
*G06K 9/62* (2006.01)
*G06K 9/00* (2006.01)
(Continued)

(52) U.S. Cl.
CPC ....... *G06K 9/6256* (2013.01); *G06K 9/00248* (2013.01); *G06K 9/00268* (2013.01);
(Continued)

(58) Field of Classification Search
CPC .... G06K 9/6256; G06K 9/00248; G06N 3/08; H04N 5/44504
See application file for complete search history.

(56) References Cited

U.S. PATENT DOCUMENTS 9,286,524 B1 * 3/2016 Mei ...................... G06K 9/6273
10,262,236 B2 * 4/2019 Lim ...................... G06K 9/6256
(Continued)

FOREIGN PATENT DOCUMENTS

WO WO-2016145379 A1 * 9/2016 ........... G06N 3/0472
WO WO-2018193311 A1 * 10/2018 ......... G06K 9/00261
WO WO-2019141992 A1 * 7/2019 ............... G06N 3/08

OTHER PUBLICATIONS

Viola et al., "Rapid Object Detection using a Boosted Cascade of Simple Features", Accepted Conference on Computer Vision and Pattern Recognition, 2001.
(Continued)

*Primary Examiner* — Pinalben Patel
(74) *Attorney, Agent, or Firm* — Greenberg Traurig, LLP

(57) ABSTRACT

In some embodiments, an exemplary inventive computer-implemented method may include steps, performed by a processor, of: obtaining training real representations of a real subject; obtaining a training synthetic representation having a visual effect applied to a synthetic subject; training a first neural network and a second neural network by: presenting the first neural network with training real representation and candidate meta-parameters of latent variables for the visual effect to generate a training photorealistic-imitating synthetic representation of the real subject with the visual effect; presenting the second neural network with the training photorealistic-imitating synthetic representation and the training synthetic representation to determine actual meta-parameters of the latent variables of the visual effect, where the actual meta-parameters are meta-parameters at which the second neural network has identified that the training photorealistic-imitating synthetic representation is realistic, and presenting to the first neural network another real representation and the actual meta-parameters of the latent variables
(Continued)

of the visual effect to incorporate the visual effect into another real subject.

18 Claims, 7 Drawing Sheets

(51) Int. Cl.
  *G06N 3/08* (2006.01)
  *H04N 5/445* (2011.01)
  *H04N 5/272* (2006.01)
  *G06N 3/04* (2006.01)
  *G06N 3/10* (2006.01)

(52) U.S. Cl.
  CPC ......... *G06N 3/0454* (2013.01); *G06N 3/0472* (2013.01); *G06N 3/08* (2013.01); *G06N 3/084* (2013.01); *H04N 5/272* (2013.01); *G06N 3/105* (2013.01); *H04N 5/44504* (2013.01); *H04N 2005/2726* (2013.01)

(56) References Cited

U.S. PATENT DOCUMENTS

| | | | |
|---|---|---|---|
| 2004/0236708 A1 | 11/2004 | Littlefield et al. | |
| 2008/0267443 A1* | 10/2008 | Aarabi | G06K 9/00234 382/100 |
| 2014/0185924 A1 | 7/2014 | Cao et al. | |
| 2014/0228118 A1* | 8/2014 | Hardy | G06T 19/006 463/31 |
| 2017/0061625 A1* | 3/2017 | Estrada | G06K 9/6267 |
| 2018/0018533 A1* | 1/2018 | Taranta, II | G06F 3/04883 |
| 2018/0157972 A1* | 6/2018 | Hu | G06N 3/08 |
| 2018/0247189 A1* | 8/2018 | Adel | G06N 3/08 |
| 2018/0374242 A1* | 12/2018 | Li | G06T 11/001 |

OTHER PUBLICATIONS

Liao et al., "Unconstrained Face Detection", pp. 1-14; Technická zpráva, Department of . . . ;2012.
Dollar et al., "Cascaded Pose Regression", 2010 IEEE Computer Society Conference on Computer Vision and Pattern Recognition; 2010.
Xiong et al., "Supervised Descent Method and its Applications to Face Alignment", Computer Vision Foundation, 2013, pp. 532-539.
Sagonas et al., "A semi-automatic methodology for facial landmark annotation", 2013 IEEE Conference on Computer Vision and Pattern Recognition Workshops, pp. 896-903.
Belhumeur et al., "Localizing Parts of Faces Using a Consensus of Exemplars", IEEE Transactions on Pattern Analysis and Machine Intelligence, vol. 35, Issue 12, Dec. 2013.
Le et al., "Interactive Facial Feature Localization", European Conference on Computer Vision, 2012, pp. 679-692.
Ren et al., "Face Alignment at 3000 FPS via Regressing Local Binary Features", The IEEE Conference on Computer Vision and Pattern Recognition (CVPR), 2014 pp. 1685-1692.
International Search Report and Written Opinion from International Application No. PCT/IB2018/000863 dated Dec. 26, 2018.

* cited by examiner

PART 5

INPUT PORTRAIT IMAGE

INPUT VISUAL EFFECT
STYLE IMAGE

OUTPUT IMAGE

COMPUTER-IMPLEMENTED METHODS AND COMPUTER SYSTEMS CONFIGURED FOR GENERATING PHOTOREALISTIC-IMITATING SYNTHETIC REPRESENTATIONS OF SUBJECTS

CROSS-REFERENCE TO RELATED APPLICATIONS

This application claims benefit of U.S. provisional patent application Ser. No. 62/531,607 filed Jul. 12, 2017, which is herein incorporated by reference for all purposes.

FIELD OF THE INVENTION

Generally, the present disclosure is directed to computer-implemented methods and computer systems configured for generating photorealistic-imitating synthetic representations of subjects.

BACKGROUND

Typically, transforming visual appearance of subjects involves receiving an input from a user that identifies a desired type of visual transformation.

SUMMARY OF THE INVENTION

In some embodiments, the present invention provides for an exemplary computer-implemented method that may include at least the following steps of: obtaining, by at least one processor, a training real visual input including a plurality of training real representations of at least one portion of at least one first real subject; obtaining, by at least one processor, a training synthetic visual input including at least one training synthetic representation having at least one first visual effect applied to at least one portion of at least one synthetic subject; training, by the at least one processor, at least one first neural network and at least one second neural network by: i) presenting the at least one first neural network with at least one training real representation of the plurality of training real representations and one or more candidate meta-parameters of one or more latent variables of the at least one first visual effect to incorporate the at least one first visual effect into the at least one portion of the at one first real subject of the at least one training real representation to generate at least one first training photorealistic-imitating synthetic representation of the at least one portion of the at least one first real subject with the at least one first visual effect; (ii) presenting the at least one second neural network with (1) the at least one first training photorealistic-imitating synthetic representation of the at least one first portion of the at least one first real subject with the at least one first visual effect and (2) the at least one training synthetic representation having the at least one visual effect applied to the at least one portion of the at least one synthetic subject to determine one or more actual meta-parameters of the one or more latent variables of the at least one first visual effect, where the one or more actual meta-parameters are meta-parameters at which the at least one second neural network has identified that the at least one first training photorealistic-imitating synthetic representation of the at least one portion of the at least one first real subject with the at least one first visual effect to be realistic; obtaining, by the at least one processor, an actual real visual input including at least one second real representation of at least one portion of at least one second real subject; obtaining, by the at least one processor, second visual effect identification data that identifies at least one second visual effect to be applied to the actual real visual input; where the at least one second visual effect corresponds to the at least one first visual effect; presenting, by the at least one processor, to the at least one first neural network, the at least one second real representation and the one or more actual meta-parameters of the one or more latent variables of the at least one first visual effect to incorporate the at least one first visual effect into the at least one portion of the at least one second real subject of the at least one second real representation to generate at least one second photorealistic-imitating synthetic representation of the at least one portion of the at least one second real subject with the at least one first visual effect; and causing, by the at least one processor, to display the at least one second photorealistic-imitating synthetic representation of the at least one portion of the at least one second real subject with the at least one first visual effect on a screen of a computing device.

In some embodiments, the training real visual input, the actual real visual input, or both, are part of each respective video stream.

In some embodiments, each respective video stream is a real-time video stream.

In some embodiments, the real-time video stream is a live video stream.

In some embodiments, the at least one first neural network is a deconvolutional neural network.

In some embodiments, the at least one second neural network is a convolutional neural network.

In some embodiments, at least one of the at least one first neural network or the at least one second neural network is a TensorFlow neural network.

In some embodiments, the exemplary method may further include a step of identifying, by the at least one processor, the one or more actual meta-parameters of the one or more latent variables of the at least one first visual effect by performing backpropagating calculations through time from a binary classification loss.

In some embodiments, the training real visual input, the actual real visual input, or both, are respectively obtained by a camera component of a portable electronic device and where the at least one processor is a processor of the portable electronic device.

In some embodiments, the at least one first visual effect includes at least one of: i) a transformation of user's face into a face of an animal, ii) a transformation of the user's face into a face of another user, iii) a race transformation, iv) a gender transformation, v) an age transformation, vi) a transformation into an object which may be closest to the user's appearance, vii) a transformation by swapping one or more parts of the user's head, viii) a transformation by making one or more drawings on one of the user's face or the user's head, ix) a transformation by deforming the user's face, x) a transformation by utilizing one or more dynamic mask, or xi) a transformation by changing the user's appearance based on one or more social characteristic.

In some embodiments, the present invention provides for an exemplary computer system that may include at least the following components: a camera component, where the camera component is configured to acquire at least one of: i) a training real visual input, or ii) an actual real visual input; at least one processor; a non-transitory computer memory, storing a computer program that, when executed by the at least one processor, causes the at least one processor to: obtain the training real visual input including a plurality of training real representations of at least one portion of at least one first real subject; obtain a training synthetic visual input including at least one training synthetic representation having at least one first visual effect applied to at least one portion of at least one synthetic subject; train at least one first neural network and at least one second neural network by: i) presenting the at least one first neural network with at least one training real representation of the plurality of training real representations and one or more candidate meta-parameters of one or more latent variables of the at least one first visual effect to incorporate the at least one first visual effect into the at least one portion of the at one first real subject of the at least one training real representation to generate at least one first training photorealistic-imitating synthetic representation of the at least one portion of the at least one first real subject with the at least one first visual effect; ii) presenting the at least one second neural network with (1) the at least one first training photorealistic-imitating synthetic representation of the at least one first portion of the at least one first real subject with the at least one first visual effect and (2) the at least one training synthetic representation having the at least one visual effect applied to the at least one portion of the at least one synthetic subject to determine one or more actual meta-parameters of the one or more latent variables of the at least one first visual effect, where the one or more actual meta-parameters are meta-parameters at which the at least one second neural network has identified that the at least one first training photorealistic-imitating synthetic representation of the at least one portion of the at least one first real subject with the at least one first visual effect to be realistic; obtain the actual real visual input including at least one second real representation of at least one portion of at least one second real subject; obtain second visual effect identification data that identifies at least one second visual effect to be applied to the actual real visual input; where the at least one second visual effect corresponds to the at least one first visual effect; present, to the at least one first neural network, the at least one second real representation and the one or more actual meta-parameters of the one or more latent variables of the at least one first visual effect to incorporate the at least one first visual effect into the at least one portion of the at least one second real subject of the at least one second real representation to generate at least one second photorealistic-imitating synthetic representation of the at least one portion of the at least one second real subject with the at least one first visual effect; and cause to display the at least one second photorealistic-imitating synthetic representation of the at least one portion of the at least one second real subject with the at least one first visual effect on a screen of a computing device.

BRIEF DESCRIPTION OF THE DRAWINGS

Embodiments of the present invention, briefly summarized above and discussed in greater detail below, can be understood by reference to the illustrative embodiments of the invention depicted in the appended drawings. It is to be noted, however, that the appended drawings illustrate only typical embodiments of this invention and are therefore not to be considered limiting of its scope, for the invention may admit to other equally effective embodiments.

Figure 1:
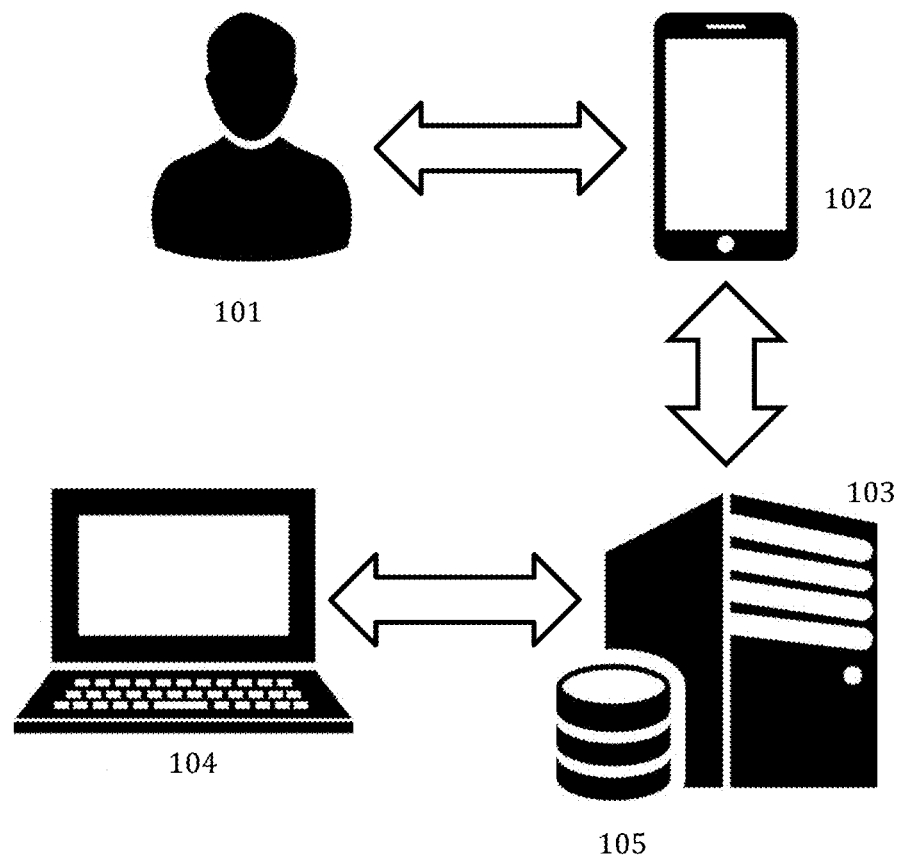
FIGS. 1-6D are representative of some exemplary aspects of the present invention in accordance with at least some principles of at least some embodiments of the present invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DESCRIPTION OF EXEMPLARY EMBODIMENTS

Among those benefits and improvements that have been disclosed, other objects and advantages of this invention can become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the present invention is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention. Further, when a particular feature, structure, or characteristic is described in connection with an implementation, it is submitted that it is within the knowledge of one skilled in the art to effect such feature, structure, or characteristic in connection with other implementations whether or not explicitly described herein.

The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" means that events and/or actions can be triggered and/or occur without any human intervention. In some embodiments, events and/or actions in accordance with the present invention can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, the inventive specially programmed computing systems with associated devices are configured to operate in the distributed network environment, communicating over a suitable data communication network (e.g., the Internet, etc.) and utilizing at least one suitable data communication protocol (e.g., IPX/SPX, X.25, AX.25, AppleTalk™, TCP/IP (e.g., HTTP), etc.). Of note, the embodiments described herein may, of course, be implemented using any appropriate hardware and/or computing software languages. In this regard, those of ordinary skill in the art are well versed in the type of computer hardware that may be used, the type of computer programming techniques that may be used (e.g., object oriented programming), and the type of computer programming languages that may be used (e.g., C++, Objective-C, Swift, Java, Javascript). The aforementioned examples are, of course, illustrative and not restrictive.

As used herein, the terms "image(s)" and "image data" are used interchangeably to identify data representative of visual content which includes, but not limited to, images encoded in various computer formats (e.g., ".jpg", ".bmp," etc.), streaming video based on various protocols (e.g., Real-time Streaming Protocol (RTSP), Real-time Transport Protocol (RTP), Real-time Transport Control Protocol (RTCP), etc.), recorded/generated non-streaming video of various formats (e.g., ".mov," ".mpg," ".wmv," ".avi," ".flv," ect.), and real-time visual imagery acquired through a camera application on a mobile device.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

As used herein, the term "user" shall have a meaning of at least one user.

In some embodiments, as detailed herein, the present invention utilizes the at least one conditional generative adversarial neural network which is programmed/configured to perform visual appearance transformations. In some embodiments, as detailed herein, an exemplary inventive computer system of the present invention may acquire one or more visual representations (e.g., photographs, video, etc.) via, for example, a frontal mobile camera, or a camera attached to the computer or any other suitable camera. Then, in some embodiments, as detailed herein, the exemplary inventive computer system of the present invention may transmit the acquired visual data to a remote server for processing, or in other implementations, may process the acquired visual data in the real-time on a computing device (e.g., mobile device, computer, etc.). During the processing stage, in some embodiments, as detailed herein, the exemplary inventive computer system of the present invention may be programmed/configured to encode the image(s) with a given vector of meta-parameters/latent variables (responsible for a particular visual effect), restore original image(s), train the encoding task and generate image(s) with desirable effect(s). In some embodiments, the resulting image may be used as a texture in combination with at least one three-dimensional (3D) model of the user (e.g., face model).

In some embodiments, examples of visual transformation effects may be, without limitation:
  turn user's face into a face of an animal,
  turn user's face into a face of another user,
  a race transformation,
  a gender transformation,
  an age transformation (making people look younger or older),
  choose an object which may be closest to the subject's appearance (based on the machine-learning algorithm's logic),
  swap parts of subject's head,
  make drawings on the subject's face or/and head,
  intentionally deform user's face,
  utilize dynamic masks (e.g., changing eye-gaze direction, eyebrow motion, opening mouth, etc.), and change user's appearance based on some predefined logic (e.g., changing user's appearance in a such way, as if they were poor, rich, live in the Stone Age, in future, astronauts, etc.).

In some embodiments, as detailed herein, the exemplary inventive computer system of the present invention may be programmed/configured to use the visual transformation effects to transform the real visual representation(s) of users and utilized the transformed visual representation(s) as users' digital/virtual masks in the real-time.

For example, FIG. 1 illustrates an exemplary computer system environment incorporating certain embodiments of the present invention. As shown in FIG. 1, the inventive environment may include a user (101), who uses, for example, a first computing device (102) (e.g., mobile phone device, laptop, etc.), a server (103) and a second computing device (104) (e.g., mobile phone device, laptop, etc.). For example, the user (101) may interact with the computing device (102) by means of its camera, which may take one or series of frames (e.g., still images, video frames, etc.), containing one or more visual representations of the user (e.g., user's head imagery, user's half-body imagery, user's full-body imagery, etc.).

In some examples, the visual representations of the user may be captured via an exemplary camera sensor-type imaging device or the like (e.g., a complementary metal oxide-semiconductor-type image sensor (CMOS) or a charge-coupled device-type image sensor (CCD)), without the use of a red-green-blue (RGB) depth camera and/or microphone-array to locate who is speaking. In other examples, an RGB-Depth camera and/or microphone-array might be used in addition to or in the alternative to the camera sensor. In some examples, the exemplary imaging device of the computing device 102 may be provided via either a peripheral eye tracking camera or as an integrated a peripheral eye tracking camera in backlight system.

In turn, the computing device (102) sends the acquired visual representations to the server (103) where images may be stored, for examples, in a database (105) prior to and after processing as detailed herein. In some embodiments, another computer/server (104) may control the processing and data storing on the server (103) and database (105). For example, the computer (104) may update at least one model and/or algorithm that is/are utilized for the processing and data storing on the server (103) and database (105).

Figure 2:
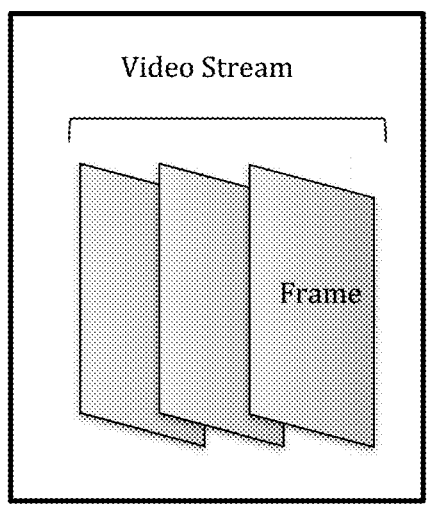

In some embodiments, the input image data (e.g., input video data) may include any appropriate type of source for video contents and may contain various video sources. In some embodiments, the contents from the input video (e.g., the video stream of FIG. 2) may include both video data and metadata. Plurality of frames may be associated with the video contents and may be provided to other modules for processing. A single picture may also be included in a frame. As shown in FIG. 2, an exemplary input video stream captured by the exemplary camera (e.g., a front camera of a mobile personal smartphone) can be divided into frames. For example, a typical movie sequence is an interleaved format of one or more camera shots, and a camera take is a continuous recorded performance with a given camera setup. Camera registration, as used herein, may refer to registration of different cameras capturing video frames in a video sequence/stream. The concept of camera registration is based on the camera takes in reconstruction of video edits. A typical video sequence is an interleaved format of one or more camera shots, and a camera take is a continuous recorded performance with a given camera setup. By registering each camera from the incoming video frames, the original interleaved format can be separated into one or more sequences with each corresponding to a registered camera that is aligned to the original camera setup.

In some embodiments, the inventive methods and the inventive systems of the present inventions can be incorporated, partially or entirely into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Figure 3:
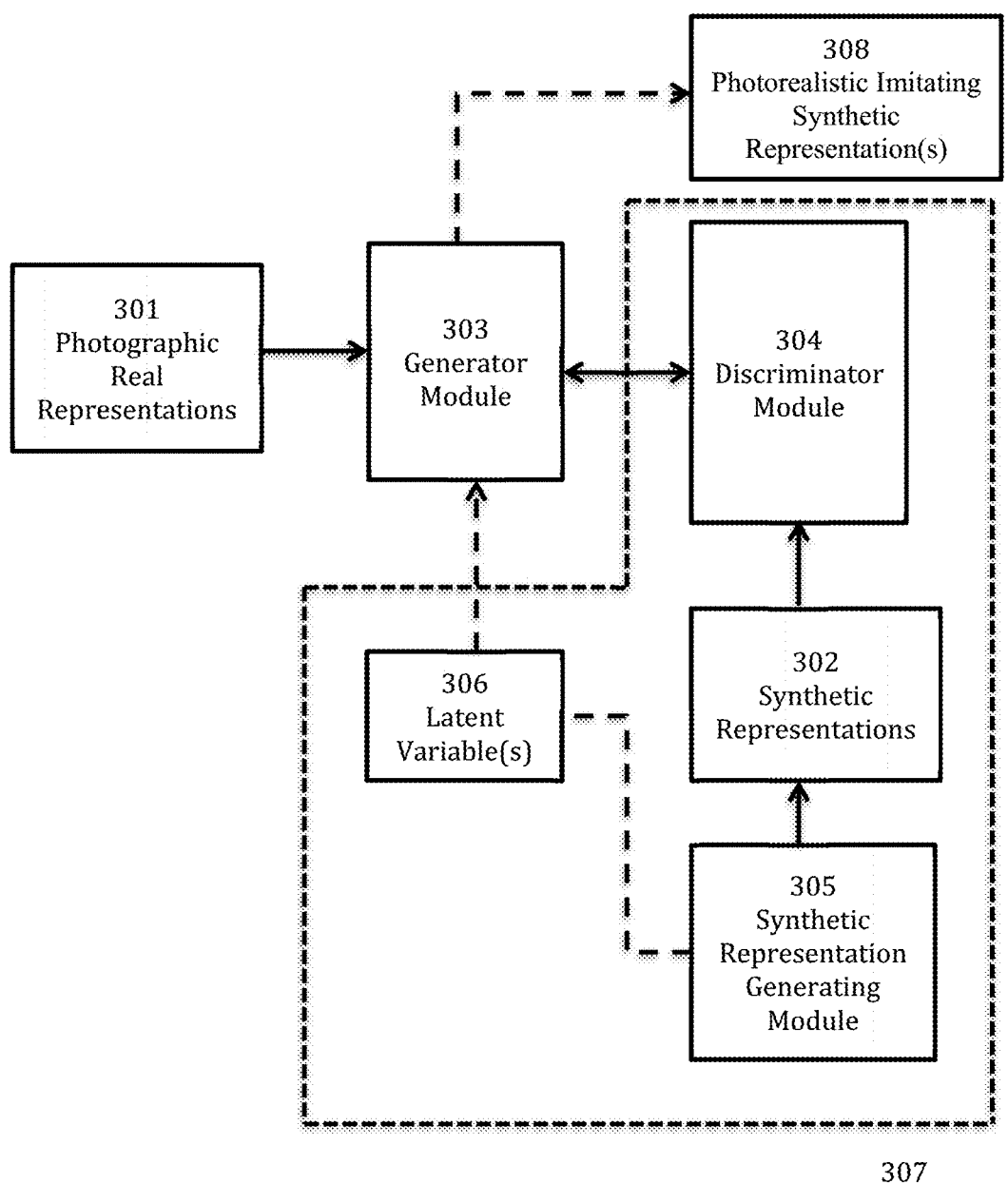

FIG. 3 illustrates an exemplary structure of an exemplary computer system programmed/configured for changing, for example, the visual representations of the user in accordance with at least some embodiments of the present invention. In some embodiments, the exemplary inventive computer system may be programmed/configured to generate photorealistic imagery with one or more visual effects. During a training phase 301-306, in some embodiments, the exemplary inventive computer system may be programmed/configured to submit/present photographic representations (e.g., image(s)) (301) and synthetic representations (e.g., image(s)) (302) to a pair of neural networks via an exemplary inventive Generator module (303) and an exemplary inventive Discriminator module (304). In some embodiments, the synthetic representations (e.g., images) may be generated by an exemplary Synthetic Representation Generating module (305). In some embodiments, examples of synthetic representation datasets that the exemplary Synthetic Representation Generating module (305) may be programmed to utilize may be obtained in part or in whole from at least one of: a dataset generated using Bleander library (exemplary description is enclosed in Appendix A), a dataset generated using FaceGen library (facegen.com) by Singular Inversions Inc. (Toronto, Calif.), a dataset generated using Unity 3D engine (Unity Technologies ApS, San Francisco, Calif.), a user-generated dataset, or any other similarly suitable dataset.

In some embodiments, during the training stage, one or more latent variables (306) may be passed to the exemplary inventive Generator module (303) by the exemplary Synthetic Representation Generating module (305). The examples of the latent variables 306 may be age, gender, race, and similarly others as detailed herein. In some embodiments, the exemplary inventive Generator module (303) may be programmed/configured to process the real photographic representation(s) (e.g., image(s), video(s), livestream(s), etc.) (301) and inventively produce "fake" photorealistic-imitating synthetic representation(s) (e.g., image(s), video(s), livestream(s), etc.). As used herein, in at least some embodiments, the term "photorealistic-imitating" or its derivative and related terms mean representations that appear to a human eye as reproducing something and/or someone that has been captured by a camera from the real life (i.e., realistic). "For examples, change(s) in "fake" photorealistic-imitating synthetic representation(s) from the original photographic real representation(s) may range from the random field adjustment(s) to representation(s) (e.g., image(s)) with one or more desired visual effects.

In some embodiments, the exemplary inventive Generator module (303)'s training objective may be to increase the error rate of the exemplary inventive Discriminator module (304) (e.g., producing synthesized instances that appear to have come from the true (real) image dataset). For example, the exemplary inventive Generator module (303) may be programmed/configured to synthesize new photorealistic-imitating synthetic representations (e.g., new images). In some embodiments, the exemplary inventive Generator module (303) "wins" points when it "tricks" the exemplary inventive Discriminator module (304) into a determination that the new photorealistic-imitating synthetic representations (e.g., new images) are real. In some embodiments, the exemplary inventive Discriminator module (304) may be simultaneously taught to discriminate between instances from true/real photographic representations (e.g., real images) and the photorealistic-imitating synthetic representations (e.g., images) generated by the exemplary inventive Generator module (303). In some embodiments, training the exemplary inventive Discriminator (304) may involve presenting the exemplary inventive Discriminator (304) with samples from one or more real datasets (301) and samples synthesized by the exemplary inventive Generator module (303), and performing backpropagating calculations through time from a binary classification loss. For example, in at least some embodiments, the inventive system may utilize Keras neural networks API (https://github.com/fchollet/keras/tree/master), written in Python and capable of running on top of TensorFlow, CNTK, or Theano, to perform backpropagating calculations. Exemplary description of Keras is enclosed herein in Appendix B.

In some embodiments, the exemplary inventive Discriminator module (304) may be simultaneously taught to discriminate between instances from the synthetic representations (e.g., synthetic representations (302)) and the photorealistic-imitating synthetic representations (e.g., images) generated by the exemplary inventive Generator module (303).

In some embodiments, the exemplary inventive Discriminator module (304) may be programmed/configured to accept input representation(s) (e.g., images) and determine whether the input came from the dataset (e.g., 301 or 302), or whether it was synthesized by the exemplary inventive Generator module (303). In some embodiments, the exemplary inventive Discriminator module (304) "wins" points when it detects real dataset values correctly, and "loses" points when it approves "fake" values or denies real dataset values.

In some embodiments, still referring to FIG. 3, during an operational phase, the component (307) of the exemplary inventive system may not be used so that the input real photographic representations (e.g., real images) (301) are fed into the exemplary inventive Generator module (303) that would generate new photorealistic-imitating representations (e.g., new images) (308) with the desired visual appearance.

In some embodiments, the exemplary inventive Generator module (303) may be programmed/configured to be in a form of a deconvolutional neural network. In some embodiments, the exemplary inventive Discriminator module (304) may be programmed/configured to be in a form of a convolutional neural network. In some embodiments, the exemplary inventive Generator module (303) may be programmed/configured to be in a form of TensorFlow™ neural network. In some embodiments, the exemplary inventive Discriminator module (304) may be programmed/configured to be in a form of TensorFlow™ neural network.

In some embodiments, during the operation phase, when the exemplary inventive Generator module (303) have been trained and the configuration parameters are fixed (e.g., weights of the Generator network are determined), the exemplary inventive computer system may be programmed/configured to submit visual representations (e.g., photographs, video, etc.) incorporated with one or more visual effects to the exemplary inventive Generator module (303) which produces photorealistic-imitating synthetic representations (307). In some embodiments, the effects may be incorporated in the synthetic dataset by changing one or more parameters. For example, one or more parameters may be selected from facial expressions, face anthropometry, race in FaceGen, age in FaceGen, and any combination thereof.

In some embodiments, the exemplary inventive Discriminator network module (304) may be programmed to generate a generalized binary output map which matches binary classifiers (0/1) with the desired segmented parts of the image (e.g., contours around subject image, other similar types of segmentation).

Figure 4A:
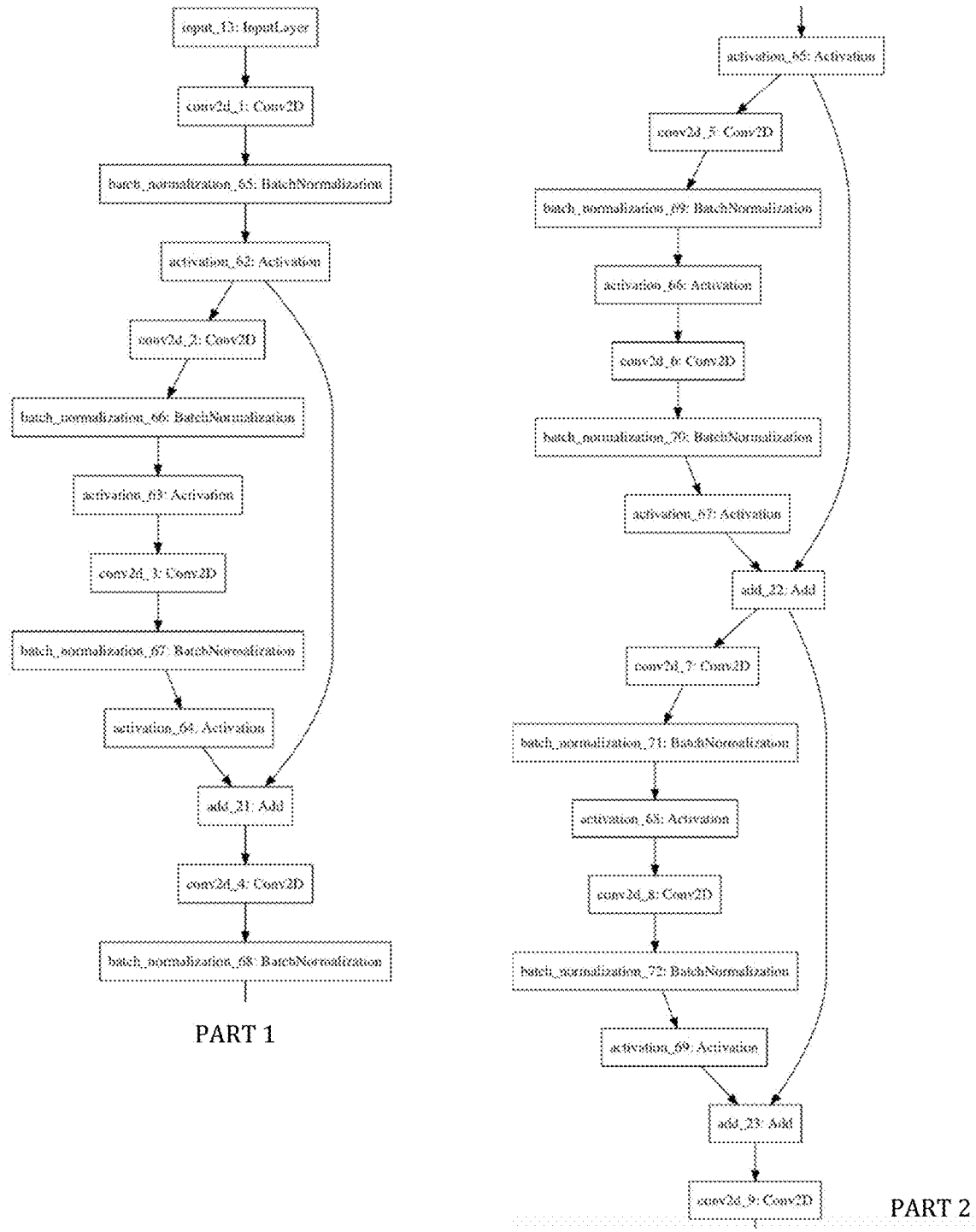
Figure 4B:
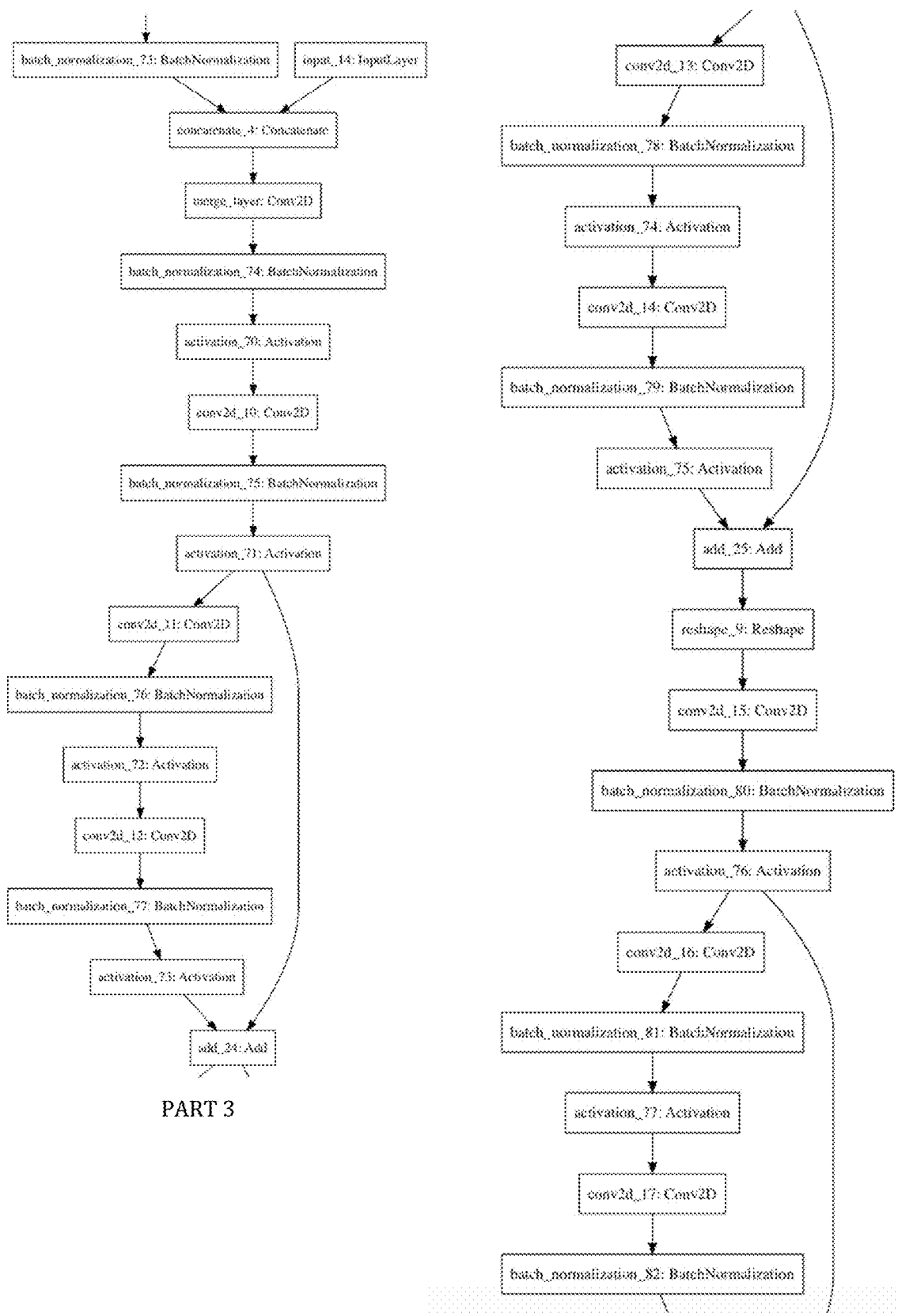
Figure 4C:
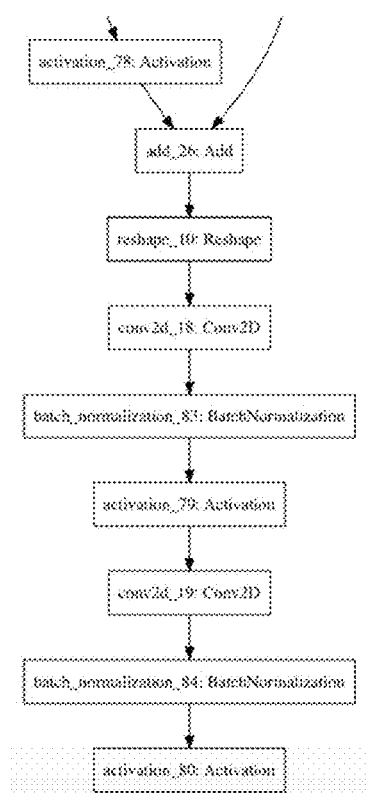

FIGS. 4A-4C illustrate five (5) parts of an exemplary inventive architecture of an exemplary neural network of the exemplary inventive Generator module (303).

Figure 5A:
Figure 5B:
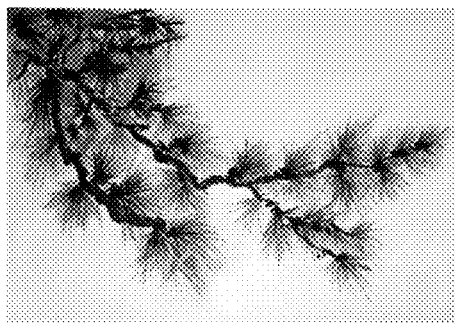
Figure 5C:
Figure 6A:
Figure 6B:
Figure 6C:
Figure 6D:

FIGS. 5A and 5B illustrate exemplary inputs (301) (e.g., real image) and a desired visual effect image (306), respectively. FIG. 5C illustrates a new photorealistic-imitating synthetic representation (308) that the exemplary inventive Generator module (303) may generate based on inputs of FIGS. 5A and 5B.

FIGS. 6A-6D illustrate how the present invention may be utilized with one or more background subtraction techniques such as described, but not limited to, in U.S. application Ser. No. 15/962,347, each of such specific techniques is incorporated herein by reference in its entirety for such purpose.

In some embodiments, the exemplary computer engine system may be configured such that its members may communicate via one or more radios modules capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, one or more radios modules may operate in accordance with one or more applicable standards in any version.

In various implementations, a final output of the present invention may be displayed on a screen which may include any television type monitor or display. In various implementations, the display may include, for example, a computer display screen, touch screen display, video monitor, television-like device, and/or a television. In various implementations, the display may be digital and/or analog. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

Further, in some embodiments, the exemplary computer system of the present invention may be utilized for various applications which may include, but not limited to, gaming, mobile-device games, video chats, video conferences, live video streaming, video streaming and/or augmented reality applications, mobile-device messenger applications, and others similarly suitable computer-device applications.

A person skilled in the art would understand that, without violating the principles of the present invention detailed herein, in some embodiments, the exemplary illustrative methods and the exemplary illustrative systems of the present invention can be specifically configured to be utilized in any combination with one or more techniques, methodologies, and/or systems detailed in U.S. application Ser. No. 15/881,353, each of such specific disclosures is incorporated herein by reference in its entirety for such purpose.

In some embodiments, the present invention provides for an exemplary computer-implemented method that may include at least the following steps of: obtaining, by at least one processor, a training real visual input including a plurality of training real representations of at least one portion of at least one first real subject; obtaining, by at least one processor, a training synthetic visual input including at least one training synthetic representation having at least one first visual effect applied to at least one portion of at least one synthetic subject; training, by the at least one processor, at least one first neural network and at least one second neural network by: i) presenting the at least one first neural network with at least one training real representation of the plurality of training real representations and one or more candidate meta-parameters of one or more latent variables of the at least one first visual effect to incorporate the at least one first visual effect into the at least one portion of the at one first real subject of the at least one training real representation to generate at least one first training photorealistic-imitating synthetic representation of the at least one portion of the at least one first real subject with the at least one first visual effect; ii) presenting the at least one second neural network with (1) the at least one first training photorealistic-imitating synthetic representation of the at least one first portion of the at least one first real subject with the at least one first visual effect and (2) the at least one training synthetic representation having the at least one visual effect applied to the at least one portion of the at least one synthetic subject to determine one or more actual meta-parameters of the one or more latent variables of the at least one first visual effect, where the one or more actual meta-parameters are meta-parameters at which the at least one second neural network has identified that the at least one first training photorealistic-imitating synthetic representation of the at least one portion of the at least one first real subject with the at least one first visual effect to be realistic; obtaining, by the at least one processor, an actual real visual input including at least one second real representation of at least one portion of at least one second real subject; obtaining, by the at least one processor, second visual effect identification data that identifies at least one second visual effect to be applied to the actual real visual input; where the at least one second visual effect corresponds to the at least one first visual effect; presenting, by the at least one processor, to the at least one first neural network, the at least one second real representation and the one or more actual meta-parameters of the one or more latent variables of the at least one first visual effect to incorporate the at least one first visual effect into the at least one portion of the at least one second real subject of the at least one second real representation to generate at least one second photorealistic-imitating synthetic representation of the at least one portion of the at least one second real subject with the at least one first visual effect; and causing, by the at least one processor, to display the at least one second photorealistic-imitating synthetic representation of the at least one portion of the at least one second real subject with the at least one first visual effect on a screen of a computing device.

In some embodiments, the training real visual input, the actual real visual input, or both, are part of each respective video stream.

In some embodiments, each respective video stream is a real-time video stream.

In some embodiments, the real-time video stream is a live video stream.

In some embodiments, the at least one first neural network is a deconvolutional neural network. In some embodiments, the at least one second neural network is a convolutional neural network.

In some embodiments, at least one of the at least one first neural network or the at least one second neural network is a TensorFlow neural network.

In some embodiments, the exemplary method may further include a step of identifying, by the at least one processor, the one or more actual meta-parameters of the one or more latent variables of the at least one first visual effect by performing backpropagating calculations through time from a binary classification loss.

In some embodiments, the training real visual input, the actual real visual input, or both, are respectively obtained by a camera component of a portable electronic device and where the at least one processor is a processor of the portable electronic device.

In some embodiments, the at least one first visual effect includes at least one of: i) a transformation of user's face into a face of an animal, ii) a transformation of the user's face into a face of another user, iii) a race transformation, iv) a gender transformation, v) an age transformation, vi) a transformation into an object which may be closest to the user's appearance, vii) a transformation by swapping one or more parts of the user's head, viii) a transformation by making one or more drawings on one of the user's face or the user's head, ix) a transformation by deforming the user's face, x) a transformation by utilizing one or more dynamic mask, or xi) a transformation by changing the user's appearance based on one or more social characteristic.

In some embodiments, the present invention provides for an exemplary computer system that may include at least the following components: a camera component, where the camera component is configured to acquire at least one of: i) a training real visual input, or ii) an actual real visual input; at least one processor; a non-transitory computer memory, storing a computer program that, when executed by the at least one processor, causes the at least one processor to: obtain the training real visual input including a plurality of training real representations of at least one portion of at least one first real subject; obtain a training synthetic visual input including at least one training synthetic representation having at least one first visual effect applied to at least one portion of at least one synthetic subject; train at least one first neural network and at least one second neural network by: i) presenting the at least one first neural network with at least one training real representation of the plurality of training real representations and one or more candidate meta-parameters of one or more latent variables of the at least one first visual effect to incorporate the at least one first visual effect into the at least one portion of the at one first real subject of the at least one training real representation to generate at least one first training photorealistic-imitating synthetic representation of the at least one portion of the at least one first real subject with the at least one first visual effect; ii) presenting the at least one second neural network with (1) the at least one first training photorealistic-imitating synthetic representation of the at least one first portion of the at least one first real subject with the at least one first visual effect and (2) the at least one training synthetic representation having the at least one visual effect applied to the at least one portion of the at least one synthetic subject to determine one or more actual meta-parameters of the one or more latent variables of the at least one first visual effect, where the one or more actual meta-parameters are meta-parameters at which the at least one second neural network has identified that the at least one first training photorealistic-imitating synthetic representation of the at least one portion of the at least one first real subject with the at least one first visual effect to be realistic; obtain the actual real visual input including at least one second real representation of at least one portion of at least one second real subject; obtain second visual effect identification data that identifies at least one second visual effect to be applied to the actual real visual input; where the at least one second visual effect corresponds to the at least one first visual effect; present, to the at least one first neural network, the at least one second real representation and the one or more actual meta-parameters of the one or more latent variables of the at least one first visual effect to incorporate the at least one first visual effect into the at least one portion of the at least one second real subject of the at least one second real representation to generate at least one second photorealistic-imitating synthetic representation of the at least one portion of the at least one second real subject with the at least one first visual effect; and cause to display the at least one second photorealistic-imitating synthetic representation of the at least one portion of the at least one second real subject with the at least one first visual effect on a screen of a computing device.

While one or more embodiments of the present invention have been described, it is understood that these embodiments are illustrative only, and not restrictive, and that many modifications may become apparent to those of ordinary skill in the art, including that various embodiments of the inventive methodologies, the inventive systems, and the inventive devices described herein can be utilized in any combination with each other. Further still, the various steps may be carried out in any desired order (and any desired steps may be added and/or any desired steps may be eliminated).

What is claimed is:

1. A computer-implemented method, comprising:
   obtaining, by at least one processor, a training real visual input comprising a plurality of training real representations of at least one portion of at least one first real subject;
   obtaining, by at least one processor, a training synthetic visual input comprising at least one training synthetic representation having at least one first visual effect applied to at least one portion of at least one synthetic subject;
   wherein the at least one first visual effect comprises at least one of:
   i) a transformation of user's face into a face of an animal,
   ii) a transformation of the user's face into a face of another user,
   iii) a race transformation,
   iv) a gender transformation,
   v) an age transformation,
   vi) a transformation into an object which may be closest to the user's appearance,
   vii) a transformation by swapping one or more parts of the user's head,
   viii) a transformation by making one or more drawings on one of the user's face or the user's head,
   ix) a transformation by deforming the user's face,
   x) a transformation by utilizing one or more dynamic mask, or
   xi) a transformation by changing the user's appearance based on one or more social characteristic;
   training, by the at least one processor, at least one first neural network to incorporate the at least one first visual effect into at least one portion of the at least one first real subject of at least one training real representation of the plurality of training real representations to generate at least one first training photorealistic-imitating synthetic representation of the at least one portion of the at least one first real subject with the at least one first visual effect based on one or more candidate meta-parameters of one or more latent variables of the at least one first visual effect;
   training, by the at least one processor, at least one second neural network to determine one or more actual meta-parameters of the one or more latent variables of the at least one first visual effect based on:
   (1) the at least one first training photorealistic-imitating synthetic representation of the at least one first portion of the at least one first real subject with the at least one first visual effect and
   (2) the at least one training synthetic representation having the at least one visual effect applied to the at least one portion of the at least one synthetic subject to determine one or more actual meta-parameters of the one or more latent variables of the at least one first visual effect;
   wherein the one or more actual meta-parameters are meta-parameters at which the at least one second neural network has identified that the at least one first training photorealistic-imitating synthetic representation of the at least one portion of the at least one first real subject with the at least one first visual effect to be realistic;
   obtaining, by the at least one processor, an actual real visual input comprising at least one second real representation of at least one portion of at least one second real subject;
   obtaining, by the at least one processor, second visual effect identification data that identifies at least one second visual effect to be applied to the actual real visual input;
   wherein the at least one second visual effect corresponds to the at least one first visual effect;
   utilizing, by the at least one processor, the at least one first neural network to incorporate the at least one first visual effect into the at least one portion of the at least one second real subject of the at least one second real representation to generate at least one second photorealistic-imitating synthetic representation of the at least one portion of the at least one second real subject with the at least one first visual effect, based on the at least one second real representation and the one or more actual meta-parameters of the one or more latent variables of the at least one first visual effect; and
   causing, by the at least one processor, to display the at least one second photorealistic-imitating synthetic representation of the at least one portion of the at least one second real subject with the at least one first visual effect on a screen of a computing device.

2. The method of claim 1, wherein the training real visual input, the actual real visual input, or both, are part of each respective video stream.

3. The method of claim 2, wherein each respective video stream is a real-time video stream.

4. The method of claim 3, wherein the real-time video stream is a live video stream.

5. The method of claim 1, wherein the at least one first neural network is a deconvolutional neural network.

6. The method of claim 1, wherein the at least one second neural network is a convolutional neural network.

7. The method of claim 1, wherein at least one of the at least one first neural network or the at least one second neural network is a TensorFlow neural network.

8. The method of claim 1, further comprising:
identifying, by the at least one processor, the one or more actual meta-parameters of the one or more latent variables of the at least one first visual effect by performing backpropagating calculations through time from a binary classification loss.

9. The method of claim 1, wherein the training real visual input, the actual real visual input, or both, are respectively obtained by a camera component of a portable electronic device and wherein the at least one processor is a processor of the portable electronic device.

10. A computer system, comprising:
a camera component, wherein the camera component is configured to acquire at least one of:
  i) a training real visual input, or
  ii) an actual real visual input;
at least one processor;
a non-transitory computer memory, storing a computer program that, when executed by the at least one processor, causes the at least one processor to:
obtain the training real visual input comprising a plurality of training real representations of at least one portion of at least one first real subject;
obtain a training synthetic visual input comprising at least one training synthetic representation having at least one first visual effect applied to at least one portion of at least one synthetic subject;
wherein the at least one first visual effect comprises at least one of:
  i) a transformation of user's face into a face of an animal,
  ii) a transformation of the user's face into a face of another user,
  iii) a race transformation,
  iv) a gender transformation,
  v) an age transformation,
  vi) a transformation into an object which may be closest to the user's appearance,
  vii) a transformation by swapping one or more parts of the user's head,
  viii) a transformation by making one or more drawings on one of the user's face or the user's head,
  ix) a transformation by deforming the user's face,
  x) a transformation by utilizing one or more dynamic mask, or
  xi) a transformation by changing the user's appearance based on one or more social characteristic;
train at least one first neural network to incorporate the at least one first visual effect into at least one portion of the at least one first real subject of at least one training real representation of the plurality of training real representations to generate at least one first training photorealistic-imitating synthetic representation of the at least one portion of the at least one first real subject with the at least one first visual effect based on one or more candidate meta-parameters of one or more latent variables of the at least one first visual effect;
train at least one second neural network to determine one or more actual meta-parameters of the one or more latent variables of the at least one first visual effect based on:
  (1) the at least one first training photorealistic-imitating synthetic representation of the at least one first portion of the at least one first real subject with the at least one first visual effect and
  (2) the at least one training synthetic representation having the at least one visual effect applied to the at least one portion of the at least one synthetic subject to determine one or more actual meta-parameters of the one or more latent variables of the at least one first visual effect;
wherein the one or more actual meta-parameters are meta-parameters at which the at least one second neural network has identified that the at least one first training photorealistic-imitating synthetic representation of the at least one portion of the at least one first real subject with the at least one first visual effect to be realistic;
obtain the actual real visual input comprising at least one second real representation of at least one portion of at least one second real subject;
obtain second visual effect identification data that identifies at least one second visual effect to be applied to the actual real visual input;
wherein the at least one second visual effect corresponds to the at least one first visual effect;
utilize the at least one first neural network to incorporate the at least one first visual effect into the at least one portion of the at least one second real subject of the at least one second real representation to generate at least one second photorealistic-imitating synthetic representation of the at least one portion of the at least one second real subject with the at least one first visual effect, based on the at least one second real representation and the one or more actual meta-parameters of the one or more latent variables of the at least one first visual effect; and
cause to display the at least one second photorealistic-imitating synthetic representation of the at least one portion of the at least one second real subject with the at least one first visual effect on a screen of a computing device.

11. The system of claim 10, wherein the training real visual input, the actual real visual input, or both, are part of each respective video stream.

12. The system of claim 11, wherein each respective video stream is a real-time video stream.

13. The system of claim 12, wherein the real-time video stream is a live video stream.

14. The system of claim 10, wherein the at least one first neural network is a deconvolutional neural network.

15. The system of claim 10, wherein the at least one second neural network is a convolutional neural network.

16. The system of claim 10, wherein at least one of the at least one first neural network or the at least one second neural network is a TensorFlow neural network.

17. The system of claim 10, wherein the computer program, when executed by the at least one processor, further causes the at least one processor to identify the one or more actual meta-parameters of the one or more latent variables of the at least one first visual effect by performing backpropagating calculations through time from a binary classification loss.

18. The system of claim 10, wherein the computing device is a portable electronic device.

* * * * *